United States Patent [19]

Eder et al.

[11] Patent Number: 5,001,887
[45] Date of Patent: Mar. 26, 1991

[54] METHOD FOR APPLYING A SHRINK SLEEVE TO THE CLOSURE END OF A CONTAINER AND APPARATUS FOR PERFORMING SUCH METHOD

[75] Inventors: Erich Eder, Donaustauf; Horst Winter, Neutraubling, both of Fed. Rep. of Germany

[73] Assignee: Krones AG Hermann Kronseder Maschinenfabrik, Fed. Rep. of Germany

[21] Appl. No.: 312,637

[22] Filed: Feb. 17, 1989

[30] Foreign Application Priority Data

Feb. 25, 1988 [DE] Fed. Rep. of Germany ....... 3805951

[51] Int. Cl.$^5$ .................... B67B 5/03; B67B 7/28
[52] U.S. Cl. .................................. 53/399; 53/487; 53/293; 53/295; 53/297; 53/585; 83/174
[58] Field of Search ............ 53/291, 297, 298, 293, 53/295, 296, 313, 314, 49, 557, 487, 585, 399, 389; 83/54, 174, 666, 667

[56] References Cited

U.S. PATENT DOCUMENTS

| | | | |
|---|---|---|---|
| 2,623,673 | 12/1952 | Holstein | 53/291 |
| 2,765,607 | 7/1953 | Aguilar et al. | 53/297 X |
| 2,858,660 | 11/1958 | Browne et al. | 53/291 |
| 2,860,468 | 11/1958 | Aguilar et al. | 53/291 |
| 3,258,881 | 7/1966 | Mason et al. | 83/174 X |
| 3,594,975 | 7/1971 | Abrecht | 53/291 X |
| 3,738,210 | 6/1973 | Fujio | 53/291 X |
| 3,901,002 | 8/1975 | Vetter | 53/389 |
| 3,910,013 | 10/1975 | Babineau | 53/291 |
| 4,133,236 | 1/1979 | Pearl | 83/174 |
| 4,497,156 | 2/1985 | Scheidegger | 53/296 X |
| 4,649,697 | 3/1987 | Konstantin | 53/291 X |

FOREIGN PATENT DOCUMENTS 104292 12/1986 European Pat. Off. .

Primary Examiner—Horace M. Culver
Attorney, Agent, or Firm—Nilles & Nilles

[57] ABSTRACT

A method for applying a shrink sleeve to the closure end of a conveyed container and apparatus for performing the method. Shrink sleeves supplied in the form of a hose are expanded over a mandrel which is disposed at an inclined position relative to the conveying direction of the containers such that the closure ends of the containers enter the lower open ends of the shrink sleeves as the containers are conveyed and before the respective shrink sleeves are cut off.

24 Claims, 3 Drawing Sheets

METHOD FOR APPLYING A SHRINK SLEEVE TO THE CLOSURE END OF A CONTAINER AND APPARATUS FOR PERFORMING SUCH METHOD

BACKGROUND OF THE INVENTION

1. Field of the Invention

The invention relates to a method for applying a shrink sleeve to the closure end of a conveyed container and an apparatus for performing such a method.

2. Description of the Related Art

Apparatus for applaying shrink sleeves to the closure ends of containers are employed for safely securing the closure of beverage bottles, the thus applied shrink sleeves permitting the user to ascertain whether or not a bottle has already been opened. To this purpose a shrink sleeve is mounted on the closure end of the bottle, i.e. cn the upper end of the bottleneck, so as to surround the closure member, for instance a threaded cap or a snap-fit plug, and a portion of the bottle neck. The sleeve is then caused to shrink by the action of heat to thereby safely secure the closure member to the bottle neck. The bottle can then only be opened by breaking the shrink sleeve. It is thus always possible to ascertain whether or not a bottle has already been opened.

A method and apparatus of the type defined above are known for instance from U.S. Pat. No. 3,738,210.

In the known apparatus a hose from which the shrink sleeves are cut is unreeled from a supply drum on which the hose is wound in a flat-folded state. After the hose has been unreeled from the supply drum it is guided over an expansion mandrel. In the known apparatus the mandrel is disposed at a vertical position; the neck of the bottle to be sealed is positioned below the mandrel, whereupon a gripper is operated to pull the hose downwards by a length corresponding to the desired height of the shrink sleeve, the lower end of the hose being slipped onto the bottle neck and subsequently cut off.

In this manner it is possible to ensure a relatively accurate positioning of the shrink sleeve. A disadvantage, however, lies in the intermittent operation of this apparatus requiring the bottle conveyor means to be stopped while the shrink sleeve is being applied. The gripper is likewise operated in an intermittent manner, resulting in a complicated operating mechanism. This intermittent operation prevents a high productivity from being obtained.

Embodiments of apparatus operating in a similar manner are also known from U.S. Pat. No. 2,765,607 and U.S. Pat. No. 3,594,975.

Additionally known from EP-OS 104,292 is an apparatus for applying shrink sleeves to bottle necks in a continuous operation without requiring the bottle conveyor means to be stopped as the sleeves are being applied. In this apparatus the collapsed hose is folded out and subsequently folded again with the original fold lines in superimposed alignment. In the thus folded state the hose is passed through a pair of cutting cylinders operable to cut individual shrink sleeves from the hose across its length. The thus cut shrink sleeves are passed on through a divergent guide component engaging their outer surfaces, in which the refolded state of the sleeves causes them to be unfolded to a substantially trapezoidal shape, permitting their leading edges to be engaged by the neck of the advancing bottle and to be slipped onto the closure end.

Although this known apparatus is capable of continuous operation, the plastic hose material from which the shrink sleeves are to be cut is required to have a wall thickness of at least 75 $\mu$m, since the resilient return force of the folded sleeve has to be sufficient for ensuring its unfolding to the trapezoidal shape.

In addition, the shrink sleeve has to have a determined minimum length for permitting it to be safely guided onto the bottle neck after having been cut off. Finally the cutting operation by means of the cutting cylinders may result in the opposed walls of the hose sticking together due to the pressure acting thereon, so that the required opening or unfolding of the sleeves for their application to respective bottle necks is prevented.

It is therefore an object of the invention to improve a method and apparatus of the type defined above in such a manner that the application of shrink sleeves of reduced height and formed of a thin-walled hose material can be accomplished at high operating speeds.

SUMMARY OF THE INVENTION

The object of the invention, as regards the method, is obtained by having shrink sleeves supplied in the form of a hose, expanded over a mandrel to be at least partially slipped onto the closure end from above in the expanded state, and finally cut off transversely of the longitudinal axis of the mandrel. The container on the one hand and the hose on the other hand are conveyed in a substantially continuous manner, and the hose is advanced obliquely from above, the conveying direction of the hose having a component directed opposite to the conveying direction of the containers. The shrink sleeve is cut off below the mandrel when the forward lower end of the hose, as seen in the conveying direction of the container, lies below the upper rim of the closure end of the container. In regards to the apparatus for performing the method, the object of the invention is obtained by having a feeding means for the hose, a cutting mechanism below the mandrel for cutting a shrink sleeve off the hose transversely of its length, and conveyor means for advancing the containers in a substantially horizontal direction. The mandrel is disposed at an inclined position, so that the hose is fed in a direction directed opposite the conveying direction of the containers. The vertical spacing between the closure end of the container and the cutting mechanism approximately corresponds to the height of the shrink sleeve to be cut off. The forward lower end of the mandrel, as seen in the conveying direction of the containers, is vertically closer to the closure end of the container, while the rearward end is disposed at a greater vertical spacing.

As the hose is supplied in an oblique direction from above in opposition to the conveying direction of the containers, the closure ends of the containers are able to enter the open lower end of the hose from the rear, at which time the forward end of the hose is already at a lower position permitting it to be engaged by the upper rim of the closure end of the container. At the accurate instance of entry of the closure end of the container into the open lower end of the hose, the hose is cut off, so that the thus cut end of the hose, eg. the shrink sleeve, is automatically entrained by the closure end of the container. This operation can proceed in an entirely continuous manner without requiring the containers to be stopped at a position below the mandrel. This permits the apparatus according to the invention to be operated at a high production rate. As the shrink sleeve is only cut off after the closure end of the container has already entered the open end of the hose, the height of the shrink sleeve may be selected to be very small, since any further conveyance of the shrink sleeve is not required. It is also possible to employ a hose material of reduced wall thickness, because the shrink sleeve is maintained in its expanded state by the mandrel until it is entered by the closure end of the container. In addition to the increased productivity due to the continuous operation there is thus the further advantage of material saving.

The method according to the invention is capable of achieving particularly high productivity rates when the operation of cutting the shrink sleeve off is already started when the rearward lower end of the hose as seen in the container conveying direction, is still at a level above the closure end of the container. At this instant the lower edge of the shrink sleeve will be disposed at a minimum spacing above the upper edge of the container.

At high operating speeds of the knife a reliably clean cutting of the hose may be achieved by heating the hose prior to its being cut.

According to another aspect of the invention, the shrink sleeve may be cut off in the conveying direction of the containers to thereby achieve particularly high productivity rates.

According to still another aspect of the invention, the continuous operation of the apparatus is facilitated by disposing the cutting mechanism immediately below the lower end of the mandrel, the cutting mechanism including a radial cutting edge mounted for rotation about an axis separate from the mandrel. A radial cutting edge of this kind permits relatively high cutting speeds to be obtained, thus enabling the hose to be continuously advanced over the mandrel at a substantially constant speed.

According to an advantageous embodiment of the invention, the lower end of the mandrel may be surrounded by a guide member with an annular passage for the hose defined therebetween. The lower end of the mandrel and the guide member thus act as a back-up shear member for cooperation with the radial cutting edge of a rotatable knife provided therewith. In this manner the hose is supported over its full circumferential extent during the mechanical cutting operation, permitting the employ of a hose material of a reduced wall thickness of for instance 35 μm. A spring or the like may be provided for biasing the knife into engagement with the guide member, so that it is in solid contact therewith during the cutting operation.

According to another advantageous aspect of the invention, the direction of rotation of the rotatable knife is substantially coincident with the container conveying direction, this provision permitting a still further productivity increase to be achieved.

The guide member may preferably be formed with a horizontally extended cam surface to ensure that the shrink sleeves cut from the hose are finally disposed at uniform positions on the closure ends of the containers as they are conveyed past the apparatus.

The provision of scavenging slots at the lower surface of the guide member offers the advantage that the radial cutting edge of the rotatable knife is automatically cleaned and resharpened after each shrink sleeve cutting operation.

Although a slicing cutting effect would basically be obtainable by providing a mechanically operated knife with a cutting edge extending obliquely to the radial direction, the cutting edge may advantageously be of a substantially triangular shape with a tip at its center. In this manner it is possible to obtain not only a slicing cutting effect, but also an initial punctiform penetration of the hose, with a sunsequent slicing effect proceeding in opposite directions until the shrink sleeve is completely cut off.

According to a particularly advantageous aspect of the invention, the provision of a back-up member, preferably located as close as possible to the location whereat the cutting of the shrink sleeve from the hose is completed, is effective in cooperation with the advancing movement of the container to exert a tilting force on the sleeve in the direction towards the closure end of the container to thereby actively promote the application of the shrink sleeve onto the closure end of the container. It has been found that this back-up member plays a particularly important role in increasing the productivity rate.

The synchronized operation of the container conveyor means and said hose feeding means with said cutting mechanism advantageously ensures that a shrink sleeve of a suitable height conforming to the type of container is alsways cut off irrespective of the container conveying speed.

In accordance with a further aspect of the invention, this synchronized operation may be achieved in a simple manner by the use of transmission means operatively connecting the drive mechanism of the rotatable knife to the hose feeding mechanism. The hose feeding means may advantageously also be adapted to the container conveying speed.

The said transmission means may advantageously comprise a cam mechanism for sinusoidally variable speed transmission adapted to ensure that the hose feeding means operates at its slowest speed and said rotatable knife at its highest speed when the hose is being cut off.

In a particularly advantageous embodiment, the drive mechanism of the rotatable knife is connected to the hose feeding means by a single-revolution clutch. This results in the advantage that the rotatable knife is accelerated fro cutting a shrink sleeve off after the hose has been fed for a predetermined length, and is rotated at a slower speed or even stopped after the cutting operation. In this manner it is advantageously ensured that the hose is always cut off at the same cutting speed of the radial cutting edge irrespective of the overall operating speed, i.e. of the actual number of containers processed per unit time.

According to another aspect of the invention, the rotatable knife may also be operated by a controlled step motor rather than via transmission means.

The continuous operation of the apparatus may advantageously ensured by the further provision that the hose feeding means is provided at its inlet side with a threading device mounted on a pivotal lever and including a guide pulley and a backup roller followed by an expansion guide, the threading device being pivotable from an inoperative position, in which the top face of the mandrel is freely accessible, to an operative position in which the expansion guide is applied over the top end of the mandrel. In this manner it is possible to reduce the down-time of the apparatus for the introduction of a new hose supply, since the new hose is automatically advanced into the apparatus after the pivotal lever has been pivoted to its operative position.

In this connection it may be advantageous to provide two such threading devices adapted to be alternately pivoted to thei operative position. In this manner it is possible to maintain the apparatus in operation without interruption by the provision of means for automatically pivoting the first threading device to its inoperative position, and the second threading device to its operative position, when the hose supply of the first threading device is exhausted.

The threading operation may be facilitated by the provision of feed rollers mounted on a one-way clutch shaft adjacent the upstream end of the mandrel and connected via reduction gear means to the drive mechanism of the hose feeder means. Due to the reduced-speed transmission for the feed rollers, the leading end of a new hose supply will then be slipped over the mandrel at a reduced speed, and will subsequently attain its normal feeding speed as soon as it is engaged by the hose feeding means. The mounting of the feed rollers on a one-way clutch shaft permits them to be freely rotated during the normal feeding operation. The feed rollers are thus helpful for ensuring the unhampered threading of the leading end of a new hose supply irrespective of the high feeding speed during normal operation.

The operation of cutting the shrink hose off may be still further improved by mounting the radial blade for sliding displacement substantially in its longitudinal direction transversely of its axis of rotation, and by connecting it to control means acting to radially displace the cutting blade during the hose cutting operation. As a result, the hose cutting operation is carried cut with a slicing effect, and that even if the cutting blade has a rectilinear cutting edge, although in the present case the blade may also be provided with a tip projecting beyond the cutting edge for penetrating the hose at the start of the cutting operation.

A particularly simple mounting of the radial cutting blade may comprise cam guide means mounted on the axis of rotation for displaceably retaining the radial cutting blade. In this manner the radial cutting blade can be radially displaced without its rotational movement being affected thereby.

The slicing effect of the hose cutting operation may be accomplished in a particularly simple manner by the use of control means comprising a cam groove at the bottom face of the apparatus, and a cam follower roller carried by the radial cutting blade and guided in the cam groove. The cam groove is advantageously of a configuration causing the radial cutting blade to be displaced radially outwards during its rotation, and to be displaced radially inwards immediately prior to contacting the hose to be cut off. This radially inwards displacement is continued until the radial cutting blade has completely cut through the hose.

BRIEF DESCRIPTION OF THE DRAWINGS

Embodiments of the invention shall now be described in detail by way of example with reference to the accompanying drawings, wherein.

DESCRIPTION OF THE PREFERRED EMBODIMENTS

Figure 1:
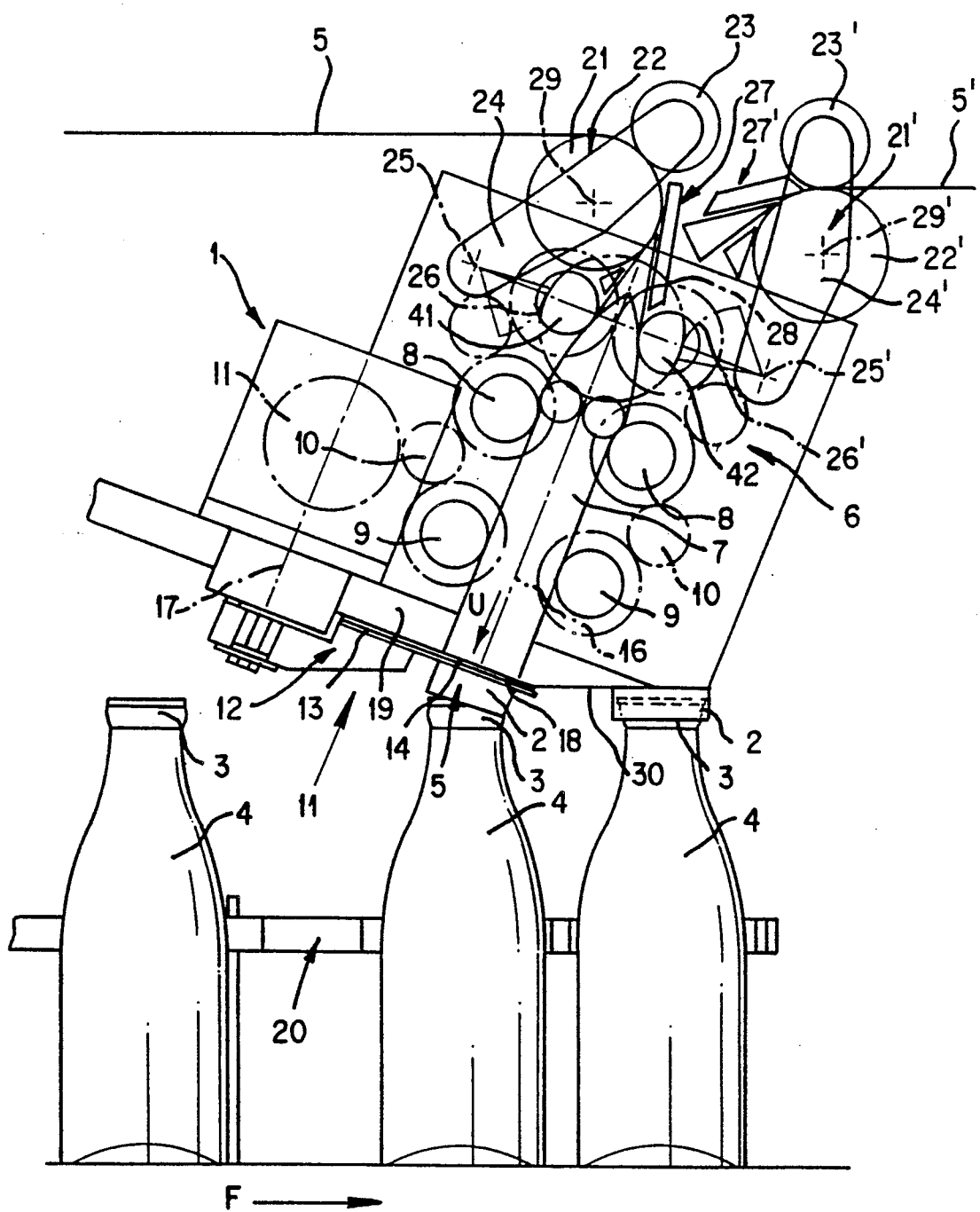
FIG. 1 shows a diagrammatical elevational view of the apparatus according to the invention.

Shown in FIG. 1 is a diagrammatical elevational view of the apparatus 1 according to the invention for applying a shrink sleeve 2 to the closure end of the bottle neck 3 of a bottle 4 supplied to the apparatus.

Shrink sleeve 2 is cut off from a hose 5 fed to the neck of the respective bottle 4 by hose feeding means 6 operable to unwind hose 5 from a supply reel (not shown).

Hose feeding means 6 includes a mandrel 7 adapted to have hose 5 slipped thereonto and thereover for expanding it to a substantially cylindrical configuration.

Mandrel 7 is of substantially cylindrical shape with flattened furfaces at opposite sides of its intermediate portion. The upper end of mandrel 7 has the shape of a conical wedge. Disposed at opposite sides of the upper and lower ends of the flat-faced intermediate portion of mandrel 7 are feed rollers 8 and 9, respectively, operable to feed hose 5 downwards in the direction of an arrow U. Feed rollers 8 and 9 perform the additional function of maintaining mandrel 7 in the position shown in FIG. 1.

Feed rollers 8 and 9 are rotatable by a motor 11 via a gear transmission 10.

As clearly illustrated in FIG. 1, mandrel 7 is supported at an inclined position, so that the feeding direction U of hose 5 includes a component directed opposite to the conveying direction F of bottles 4. As a result, bottles 4 are caused to enter the open end of hose 5 from below with their necks 3.

Disposed below mandrel 7 is a cutting mechanism 12 including a rotatable knife 13 having a substantially radially directed cutting edge 14 as more clearly shown in FIG. 2. The configuration of cutting edge 14 is substantially composed of two concave sections cooperating to form a tip 15 at the center of cutting edge 14, resulting in a substantially triangular shape of its center portion. Rotatable knife 13 is mounted for rotation about an axis at a spaced location from the axis 16 of mandrel 7. Rotatable knife 13 is operated in synchronism with the operation of feeder means 6 by motor 11.

Figure 2:
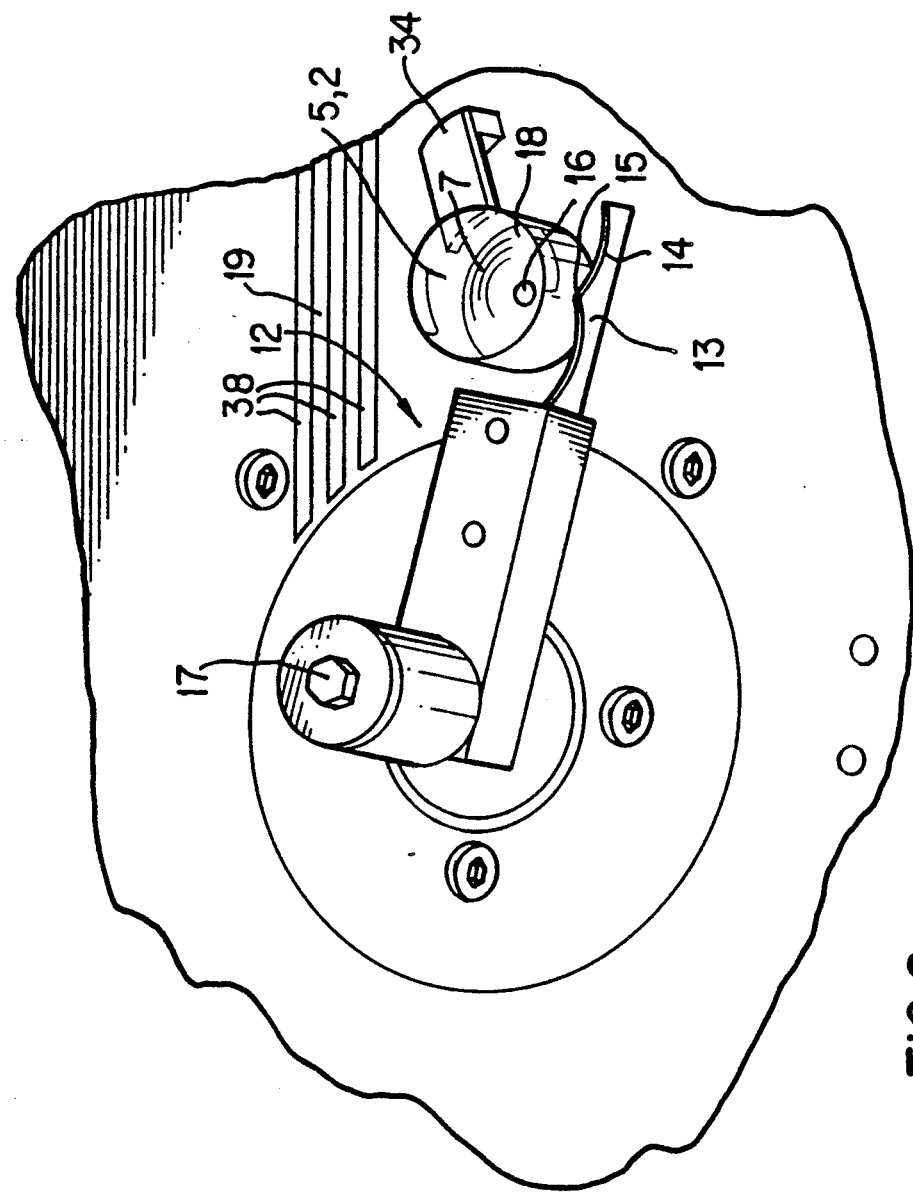
FIG. 2 shows a perspective view of parts of the apparatus depicted in FIG. 1, generally taken in the direction of the arrow II in FIG. 1.

As particularly shown in FIG. 2, the lower end face 18 of mandrel 7 is surrounded by a guide member 19 so as to define an annular passage for hose 5 therebetween. Rotatable knife 13 has its cutting edge disposed in close proximity to lower end face 18 of mandrel 7, so that the lower surface 30 of guide member 19 acts as a shear member for cooperation with radial cutting edge 14 of rotatable knife 13. Lower end face 18 of mandrel 7 is inwards offset from lower surface 30 of guide member 19 by a few hundredth or thenths of a millimeter to act as a back-up support for hose 5 as it is being cut.

In the embodiment shown, the drive mechanism for rotatable knife 13 is connected to the drive mechanism of feeder means 6 through a transmission mechanism not shown in detail, so that motor 11 is operable to operate both feeder means 6 and rotatable knife 13, as already indicated above.

Operatively connected between motor 11 and rotatable knife 13 is a per se known single-revolution clutch likewise not shown in FIG. 1, to thereby ensure that knife 13 is rotated for a single revolution after a predetermined number of revolutions of motor 11, and is subsequently stopped until motor 11 has again performed the predetermined number of revolutions.

A conveyor mechanism for bottles 4 may comprise a conventional notched disc 20 diagrammatically indicated in FIG. 1. The drive mechanism of notched disc 20 is synchronized in a conventional manner with motor 11 of feeder means 6, as for instance by a sensor-control device. Instead of employing a separate motor it would also be possible to provide a transmission mechanism for operatively connecting hose feeder means 6 and rotatable knife 13 to a main drive source of the apparatus also used for rotating notched disc 20.

Also shown in FIG. 1 are two threading devices 21, 21' provided at the upstream end of hose feeder means 6. Both threading devices 21 and 21' are essentially of the same construction and disposed at symmetric position, so that only the threading device designated 21 shall be described in detail.

Threading device 21 includes a guide roller 22 and a backup roller 23 mounted on a common pivotal lever 24. Rigidly connected to pivotal lever 24 at a concentric position with its pivot axis 25 is a gear segment 26.

Disposed downstream of guide roller 22 is an expansion guide 27 for expanding hose 5 advanced by guide roller 22 and back-up roller 23 in a collapsed state.

Disposed between the two gear segments 26, 26' of the two threading devices 21 and 21' is a gear 28 operable to alternately pivot threading devices 21 and 21' between respective operative and inoperative positions.

In the state shown in FIG. 1, threading device 21 is in its operative position in which expansion guide 27 is applied onto the upper end of mandrel 7. By contrast, threading device 21' is shown in its inoperative position, in which expansion guide 27' is pivoted away from the top end of mandrel 7. Clockwise rotation of gear 28 by an angle of about 40° causes threading device 21 to be pivoted counter-clockwise to its inoperative position, while threading device 21' is pivoted, likewise counter-clockwise, to its operative position. Guide rollers 22 and 22' are mounted on respective one-way clutch shafts 29 and 29'.

Disposed adjacent the upstream end of mandrel 7 are pairs of feed rollers 41 and 42 operatively connected by not shown transmission means to the drive mechanism of feeder means 6. The diamater of feed rollers 41 and 42 is smaller than that of feed rollers 8 and 9, so that hose 5 is slipped onto mandrel 7 at an initial speed below its normal feeding speed. Feed rollers 41 and 42 are mounted on one-way clutch shafts permitting them to be freely rotated as soon as hose 5 is engaged by feed rollers 8.

As clearly shown in FIG. 2, a back-up member 34 is disposed on the lower surface of guide member 19 at a position to the rear of mandrel 7 in the direction of rotation of knife 13. Back-up member 34 is formed with a stop surface directed towards shrink sleeve 2 at the location whereat rotatable knife 13 finally passes through hose 5. Back-up member 34 is slightly spaced from the lower surface of guide member 19, permitting rotatable knife 13 to pass through the thus formed gap therebetween. The back-up member is otherwise disposed above the path of movement of the closure ends of the bottles.

Farther beyond mandrel 7 in the direction of rotation of knife 13 are a number of scavenging slots 38 provided for automatically cleaning and re-sharpening radial cutting edge 14 of rotatable knife 13 to thereby substantially eliminate the need for the cutting edge to be re-sharpened. Rotatable knife 13, or its radial cutting edge 14, respectively may be biased into engagement with the lower surface of guide member 19 by a spring or the like, so that the rotating knife is always maintained in contact with the guide member during its rotation. This is preferably accomplished by means of a leaf spring which may extend in the longitudinal direction of the rotating knife. Although in the embodiment shown the radial cutting edge has a central tip 15 with two concave slicing portions on both sides thereof, it is also conceivable to provide a cutting edge 14 of triangular shape with two convex sclicing portions.

The method according to the invention shall now be explained in detail with reference to the operation of the described apparatus.

The apparatus is prepared for operation by inserting hose 5 into threading device 21. Counterclockwise rotation of gear 28 then causes threading device 21 to be pivoted to the operative position shown in FIG. 1. Hose 5 is then passed over expansion guide 27 and onto mandrel 7 until it is engaged by feed rollers 31, 32 and 8, 9 to be subsequently advanced to the lower end 18 of mandrel 7. At the same time notched disc 20 is operated to convey bottles 4 in the direction of arrow F. The bottle conveying means is operated in synchronism with the hose feed means 6. As a bottle 4 with its neck 3 is conveyed in the direction of arrow F, hose 5 is simultaneously fed obliquely downwards in the direction of arrow U. This causes the neck 3 of a bottle 4 and the lower end of hose 5 to approach one another in the manner shown in FIG. 1 with respect to the second bottle. The inclined feeding direction of hose 5 permits neck 3 of bottle 4 to enter the open lower end of hose 5 without being hampered thereby, while the hose 5 continues to be advanced.

When a bottle has substantially reached the position of the second bottle shown in FIG. 1, rotatable knife 13 is operated to cut the end portion of hose 5 projecting beyond lower end face 18 of mandrel 7 (FIG. 2). Since the thus cut shrink sleeve 2 is obtained from a hose in an originally collapsed configuration, it has the tendency to return to the collapsed state after having been cut, as a result of which it comes into lateral engagement with the bottle neck 3. As the bottle 4 continues to be conveyed, the top end of shrink sleeve 2 slides along the lower surface 30 of guide member 19, this surface extending in a substantially horizontal direction in the bottle conveying direction F. The lower surface 30 is thus effective to accurately position shrink sleeve 2 on bottle neck 3. Back-up member 34 is effective to prevent shrink sleeve 2 from being distorted by the cutting operation even at very high operating speeds, thus ensuring its being reliably slipped onto the closure end of bottle 4. The cutting operation may be further facilitated by heating hose 5 before it is being cut off.

After leaving apparatus 1, bottle 4 is passed on to a conventional shrinking oven (not shown), wherein sleeve 2 is fixedly shrunk onto its closure end.

When the hose supply reel (not shown) associated to threading device 21 has been completely unwound, gear 28 is rotated clockwise to pivot threading device 21' to its operative position, so that another hose 5' is unwound from a seond hose supply reel (not shown) without interruption of the continuous operation.

Although in the embodiemnt described above the conveying of bottles 4 as well as the feeding of hose 5 proceeds in a continuous manner at constant speeds, it is also conceivable to feed the hose at alternatingly variable speeds, for instance in such a manner that the hose feeding speed is slower while the shrink sleeve is being cut of than during the remainder of the feeding operation. In the embodiment shown and described, the apparatus operates at a speed of for instance 36,000 bottles per hour, corresponding to a hose feeding speed of about 20 cm per second. During the sleeve cutting operation the hose feeding speed may for instance be reduced to one-half of the mean feeding speed. Between successive sleeve cutting operations the hose feeding speed may then be increased to one-and-a-half times the mean feeding speed. The operation of rotatable knife 13 may be controlled in such a manner that it moves at a very high speed during the sleeve cutting operation, and at a slower speed for the remainder of the time. This variable-speed operation of the rotatable knife and/or the hose feed means may be accomplished by means of a cam mechanism.

It is also conceivable to employ a laser beam cutting device rather than a cutting mechanism using a rotatable knife. The laser beam emitted by the laser could be moved in the same manner as the radial cutting edge of the rotatable knife by means of a rotatable mirror device. The employ of a laser beam cutting device would eliminate the need of the guide member; in this case it would also not be necessary to direct the laser beam to a location immediately below the lower end of the mandrel.

It would also be conceivable to employ a cutting knife having cutting edges on opposite sides, in which case the knife would not be required to perform a full revolution, but rather only an angular movement determined by the diameter of the hose. This would permit a shrink sleeve to be cut off the hose by angular displacement of the knife in alternating directions. This operation of the sleeve cutting knife would permit it to be actuated by a step motor or the like which is not mechanically coupled to the hose feeding drive mechanism but controlled in synchronism therewith.

Figure 3:
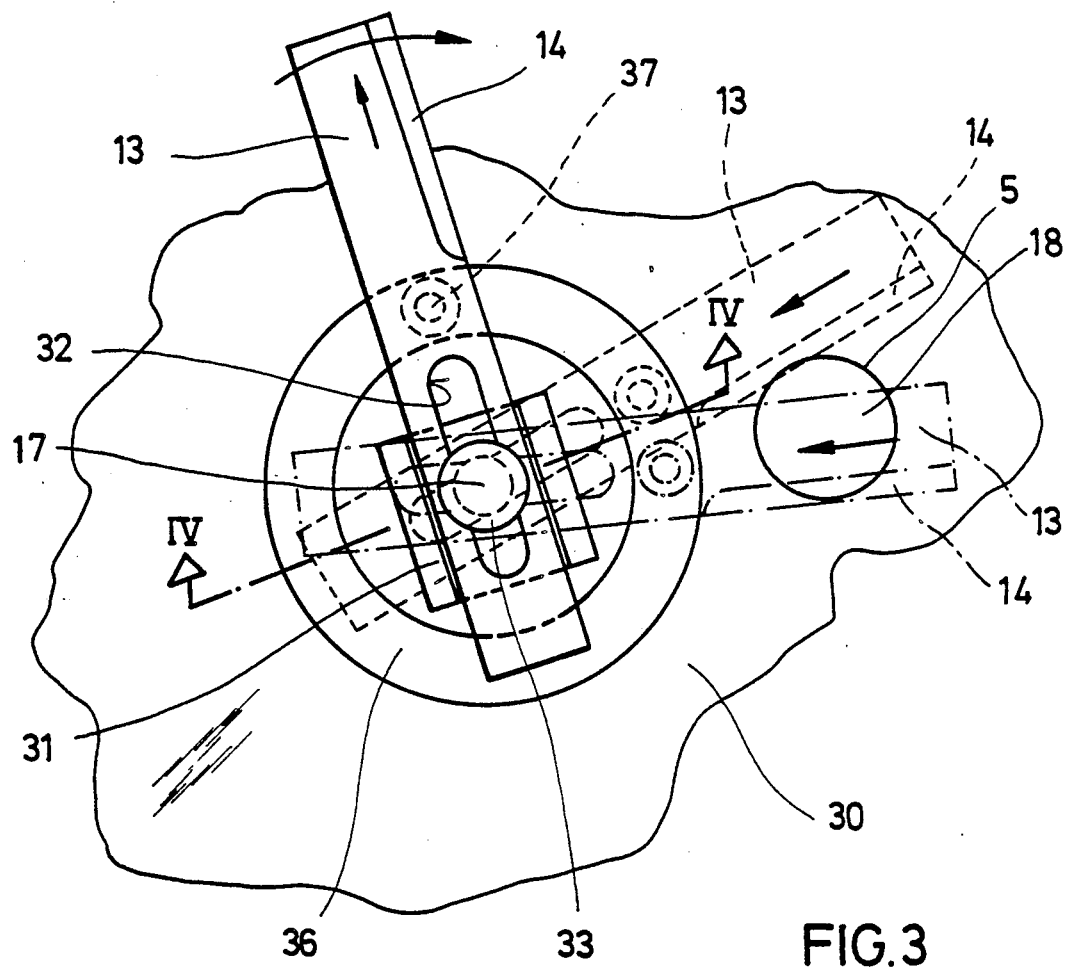
FIG. 3 shows a bottom view of parts of the apparatus, depicting a modification of the cutting device.
Figure 4:
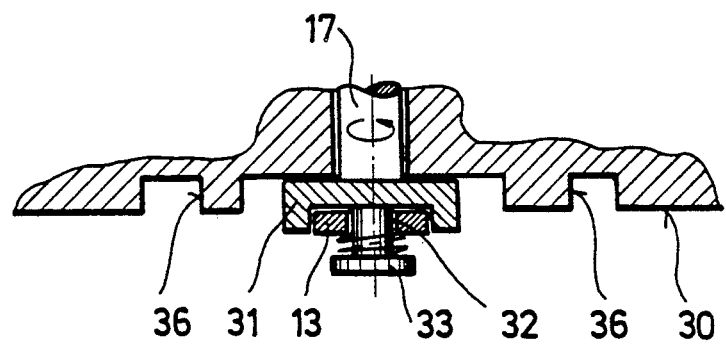
FIG. 4 shows a sectional view of the bottom portion of the apparatus, taken along the line IV—IV in FIG. 3.

FIGS. 3 and 4 show a modification of the cutting device 13 shown in FIG. 2. This cutting device 13 is basically of a construction similar to that of the cutting device described above, for which reason the same reference numerals will be used to designate identical or similar components. The following description will thus be restricted to the particulars of the modification shown in FIGS. 3 and 4.

As clearly shown in FIGS. 3 and 4, the axis of rotation 17 has a guide member 31 non-rotatably secured thereto. The rotatable knife 13 is formed with an elongate opening 32 for receiving therein a bearing pin 33 secured to guide member 31. The width of rotatable knife 13 corresponds to that of guide member 31, so that knife 13, and thus its radial cutting edge 14, is retained in guide member 31 for radial displacement relative to its axis of rotation 17. For ensuring intimate contact of radial cutting edge 14 with the bottom surface of guide member 19, bearing pin 33 carries a compression spring supported between a shoulder 35 of bearing pin 33 and rotatable knife 13. Formed in bottom face 30 of guide member 19 is a cam groove 36 depicted in FIG. 4 in a cross-sectional view. Mounted on the side of rotatable knife 13 facing towards bottom face 30 is a cam follower roller 37 to be received in cam groove 36, so that rotation about axis 17 causes rotatable knife 13, and thus radial cutting edge 14, to be radially displaced.

The operation of the cutting device shown in FIGS. 3 and 4 shall now be explained in detail:

Rotatable knife 13 is rotated about its axis of rotation 17 in synchronism with hose feeding means 6. In this embodiment it is also possible to employ a cam transmission mechanism permitting the hose to be cut off at an instant when its feeding speed is at a minimum, whereas hose 5 is fed at a maximum speed while it is not being cut.

Rotation about axis 17 causes cam follower roller 37 to travel along cam groove 36 to thereby determine the radial position of radial cutting edge 14 of rotatable knife 13. The configuration of cam groove 36 results in the radial distance between cam follower roller 37 and axis of rotation 17 increasing until radial cutting edge 14 is in a position just short of hose 5. From this position cam groove 36 extends in a direction towards axis of rotation 17, as a result of which the distance between cam follower roller 37 and axis 17 is rapidly reduced during further rotation. This occurs exactly at the time during which hose 5 is being cut off by radial cutting edge 14 of rotatable knife 13, as shown by the positions of knife 13 illustrated by dotted and dash-dotted lines, respectively.

Although in the illustrated modification radial cutting edge 14 is of rectilinear shape, it is also conceivable to provide radial cutting edge 14 with a tip as in the cutting device 12 shown in FIG. 2.

It will additionally be noted that in the modified cutting device 12 shown in FIGS. 3 and 4, the rotatable knife 13 is rotated in a direction opposite to that of the rotation of knife 13 in FIG. 2. This does not, however, affect the operation of the device in undue manner.

We claim:

1. A method for applying a shrink sleeve to the closure end of a conveyed container comprising the steps of:

providing shrink sleeves (2) supplied in the form of a hose (5, 5');
providing a mandrel (7) having a substantially cylindrical shape with a longitudinal axis;
providing a guide member (19) surrounding a lower end of said mandrel and forming an annular passage between said mandrel and said guide member;
expanding said hose over said mandrel and advancing said hose through said annular passage;
conveying said container (4) in a conveying direction (F) in a substantially continuous manner;
advancing said hose in a substantially continuous manner obliquely from above said container and in a direction (U) having a component directed opposite to the conveying direction (F) of said container;
slipping said hose at least partially over said closure end of said container (4); and
cutting off said shrink sleeve (2) transversely of said longitudinal axis of said mandrel (7) and at a point below said mandrel and below said guide member (19) when the forward end of said hose, as seen in said conveying direction (F) of said container, lies below the upper rim of said closure end (3) of said container (4).

2. A method according to claim 1, characterized in that the operation of cutting said shrink sleeve (2) off is started when the rearward lower end of said hose (5), as seen in said conveying direction (F) of said containers (4) is still above said closure end (3) of said container (4).

3. A method according to claim 1, characterized in that said hose (5) is heated prior to being cut off.

4. A method according to claim 1 characterized in that said container (4) is conveyed by rotating a notched disc (20), and said shrink sleeve (2) is cut off by rotating a knife (13) so that said shrink sleeve (2) is cut off in said conveying direction (F) of said container (4).

5. An apparatus for applying a shrink sleeve to the closure end of a conveyed container comprising of:
   a mandrel (7), having a substantially cylindrical shape with a longitudinal axis, for expanding shrink sleeves supplied in the form of a hose (5);
   a guide member (19) surrounding a lower end portion (18) of said mandrel and an annular passage between said mandrel and said guide member;
   feeding means (8) for feeding said hose over said mandrel and through said annular passage;
   a cutting mechanism (12) below said mandrel and below said guide member for cutting a shrink sleeve (2) off said hose transversely of its length;
   conveyor means (20) for advancing said container in a substantially horizontal conveying direction (F);
   said mandrel (7) being disposed at an inclined position above said container so that said hose (5) is fed in a direction having a component directed opposite the conveying direction (F) of said container (4), and so that the forward lower end of said mandrel (7) as seen in said conveying direction (F) of said container (4) is vertically closer to said closure end (3) of said container while the rearward end is disposed at a greater vertical spacing such that the vertical spacing between the closure end (3) of said container (4) and said forward lower end of said mandrel (7) is slightly less than the height of the shrink sleeve (2) to be cut off.

6. Apparatus according to claim 5, characterized in that said cutting mechanism is disposed immediately below the lower end of said mandrel (7) and comprises a rotatable knife (13) having a radial cutting edge (14) adapted to be rotated about an axis (17) spaced from said longitudinal axis of said mandrel (7).

7. Apparatus according to claim 6, characterized in that the lower end portion (18) of said mandrel (7) and said guide member (19) act as a shear member cooperating with said radial cutting edge (14) of said rotatable knife (13).

8. Apparatus according to claim 7, characterized in that said conveyor means (20) comprises a rotatable notched disc, and the direction of rotation of said rotatable knife (13) adjacent said mandrel (7) substantially corresponds to said conveying direction (F) of said containers (4).

9. Apparatus according to claim 7, characterized in that the lower surface of said guide member (19) extending further on in the conveying direction (F) of said containers (4) is formed as a horizontally directed cam surface (30) for pressing said shrink sleeves (2) onto said closure ends (3).

10. Apparatus according to claim 7, characterized in that the lower surface of said guide member (19) is formed with scavenging slots (33).

11. Apparatus according to claim 6, characterized in that said radial cutting edge (14) is of substantially triangular shape with a tip (15) at its center.

12. Apparatus according to claim 7, characterized in that a back-up member (34) having a stop surface directed toward said shrink sleeve (2) is secured to the lower surface of said guide member (19).

13. Apparatus according to claim 1, characterized in that said conveyor means (20) for said containers (4) and said feeding means (6) for said hose (5) are operable in synchronism with said cutting mechanism.

14. Apparatus according to claim 7, characterized in that the drive mechanism for said rotatable knife (13) of said cutting mechanism (12) is operatively connected via transmission means to the feeding means (6) for said hose (5).

15. Apparatus according to claim 14, characterized in that said transmission means comprises a cam mechanism for sinusoidally variable speed transmission to ensure that said feeding means (6) operates at its slowest speed, and said rotatable knife (13) at its highest speed when said hose (5) is being cut off.

16. Apparatus according to claim 7, characterized in that the drive mechanism of said rotatable knife (13) is connected to said feeding means (6) for said hose (5) by a single-revolution clutch.

17. Apparatus according to claim 7, characterized in that said rotatable knife (13) is rotated by a controlled step motor.

18. Apparatus according to claim 25, characterized in that said feeding means (6) for said hose (5) is provided at its inlet side with a threading device (21, 21') mounted on a pivotal lever (24) and including a guide pulley (22, 22') and a back-up roller (23, 23') followed by an expansion guide (27, 27'), said threading device (21, 21') being pivotable from an inoperative position, in which the top face of said mandrel (7) is freely accessible, to an operative position in which said expansion guide (27, 27') is applied over the top end of said mandrel (7).

19. Apparatus according to claim 18, further comprising of two threading devices (21, 21') alternately operable to be brought to the operative position.

20. Apparatus according to claim 18, further comprising of feed rollers (31, 32) mounted on a one-way clutch shaft (29, 29') adjacent the upstream end of said mandrel (7) and connected via reduction gear means to the drive mechanism of said feeder means (6) for said hose (5).

21. Apparatus according to claim 6, characterized in that said radial cutting edge (14) is mounted for sliding displacement substantially in its longitudinal direction and transversely of its axis of rotation (17), and connected to control means (36, 37) acting to radially displace said radial cutting edge (14) during the hose cutting operation.

22. Apparatus according to claim 21, characterized in that said axis of rotation (17) has cam guide means (31) mounted thereon for displaceably retaining said radial cutting edge (14).

23. Apparatus according to claim 21, characterized in that said control means comprises a cam groove (36) at the bottom face (30) of the apparatus, and a cam follower roller (37) carried by said radial cutting edge (14) and guided in said cam groove (36).

24. Apparatus according to claim 5, characterized in that the vertical spacing between the closure end (3) of said container (4) and said rearward end of said mandrel (7) is slightly greater than the height of the shrink sleeve (2) to be cut off.

* * * * *